UNITED STATES PATENT OFFICE.

MAX HAMEL, OF GRÜNAU, NEAR BERLIN, GERMANY.

PROCESS OF MAKING CONCENTRATED FORMIC ACID.

No. 806,660. Specification of Letters Patent. Patented Dec. 5, 1905.

Application filed February 27, 1904. Serial No. 195,626.

*To all whom it may concern:*

Be it known that I, MAX HAMEL, a subject of the King of Prussia, German Emperor, and a resident of Wilhelmstrasse 1, Grünau, near Berlin, Germany, have invented a new and Improved Process for the Production of Concentrated Formic Acid, of which the following is a full, clear, and exact description.

The production of formic acid which is free or almost free from water from formiates by means of mineral acids has hitherto been only indirectly possible. On account of the ease with which formic acid decomposes in the presence of concentrated sulfuric acid the transformation of the dry formiates could only be effected with sulfuric acid having a strength of at most 60° Baumé. The diluted formic acid thus obtained had then to be concentrated by repeated distillation with concentrated sulfuric acid according to the process devised by Maquenne. The mixing of the dry formiate with the sulfuric acid cannot for various reasons be effected so exactly as to obtain a good yield. Thus if highly-concentrated sulfuric acid is allowed to drop on formiate a very considerable rise of temperature locally occurs which cannot be removed by cooling, as in the mass lumps or the like are formed, so that the mass becomes thick and cannot be stirred, and the sulfuric acid being not rapidly combined comes in contact with the formic acid set free and decomposes the same. On the other hand, with the repeated distillation with sulfuric acid of 66° Baumé considerable losses cannot be avoided, the amount of which Maquenne states is about five per cent. for each distillation; but in practice the amount is generally considerably greater. Experiments have now shown that formic acid of any desired high concentration up to the so-called "anhydrous" state can be produced from formiates directly by a single distillation without fear of any decomposition of any kind if the formiate is dissolved in a solvent before treatment with concentrated sulfuric acid. The solvent should be free from water or contain water only in proportion corresponding to the desired degree of concentration of the formic acid to be obtained. By employing such a solvent all sulfuric acid is immediately combined with the base of the formiate without forming lumps or the like and effecting the thickening of the mass, so that the mass can be easily stirred, and therefore a rise of temperature can be easily removed by cooling. Such rise of temperature in the present process is, moreover, not so dangerous, since the sulfuric acid added to the formiate dissolved in a suitable solvent is bound at once so as to be prevented from injuriously acting in its free state upon free formic acid. Moreover, the formic acid is diluted by the solvent employed, which fact assists also in diminishing the deleterious action of the sulfuric acid on the formic acid. For these reasons the present process can be carried out with good results at temperature even rising to the boiling-point of the liquid. No sulfuric acid will come in contact for an appreciable time with the formic acid set free, as it becomes combined before it can act on and decompose the formic acid. As solvent for the formiate there may be employed mainly highly-concentrated or anhydrous formic acid itself; but also other solvents may be employed which (as, *e. g.*, highly-concentrated or anhdyrous acetic acid) have another boiling-point and can be sufficently separated by distillation from the formic acid by keeping the correct temperature or which solvents remaining in the concentrated formic acid do not by their presence injure the practical or technical employment of the latter.

This process forming the object of the present invention is best carried out by putting a part of the formiate to be operated upon into approximately the same quantity of formic acid (this quantity may, however, be varied as the case may be) and then slowly running in while cooling, if desired, the corresponding quantity of concentrated sulfuric acid. This introduction of formiate and sulfuric acid alternately is repeated as often as desired. Neutral sulfate results from the reaction as a precipitate, this being separated from the formic acid in a well-known manner. The addition of a greater quantity of sulfuric acid than that requisite for the formation of the neutral sulfate, such as was formerly deemed necessary for certain reasons, is here unnecessary. The process, therefore, immediately gives, even when acting upon a crude formiate, an acid which is technically free from chlorin, its strength being only dependent on the strength of the formic acid used for the solution and on that of the sulfuric acid employed. In practice sodium formiate will be usually employed.

In carrying out this process by using concentrated formic acid (containing about one hundred per cent. formic acid) one hundred kilograms of the same and also of sodium formiate may be placed in the vessel and then seventy kilograms of sulfuric acid containing one hundred per cent. $H_2SO_4$ may be added while stirring and while reducing by cooling the undesirable rise of temperature. After the reaction has taken place one hundred kilograms sodium formiate and seventy kilograms sulfuric acid are added again and in the same manner as before. This may be repeated as often as the vessel permits the process to be undertaken. After this distillation is carried out the vapors are liquefied by cooling in a well-known manner. The obtained distillate is the desired concentrated formic acid. If the formiate is employed in a wet state, the same result is obtained when using fuming sulfuric acid whose amount of free sulfuric acid anhydrid ($SO_3$) corresponds to the amount of wetness of the formiate. In place of formic acid of one hundred per cent. there may, if desired, be employed a formic acid of ninety per cent., in which case seventy-five kilograms of sulfuric acid of 66° Baumé are then added, thus obtaining formic acid of about ninety per cent., which concentration it was hitherto not possible to obtain directly. The requisite quantity of formic acid for a new operation may be taken from the distilled formic acid, so that it is only necessary for the commencement of the manufacturing to procure special formic acid. Such an amount of the reaction liquid as contains a quantity of formic acid requisite for the operation can, however, be utilized instead of employing the distilled formic acid as a dissolving agent for the carrying out of the operation.

Sulfuric acid in the form of a bisulfate—for example, sodium bisulfate—can be employed in an entirely analogous manner for the described process, and then in the reaction half of the sulfuric acid contained in the bisulfate is effective, existing, so to speak, only in a half-bound condition. The bisulfate acts in the present process like concentrated sulfuric acid, of which, therefore, in this case it can be regarded as an equivalent. One molecule of the half-bound sulfuric acid of the sodium bisulfate—consequently two molecules of sodium bisulfate—are employed for each molecule of sulfuric acid which would otherwise be employed. The quantity of bisulfate to be used can be readily calculated from this. In this case also the transformation into concentrated formic acid and into neutral sulfate proceeds smoothly, whereas such a transformation according to known methods for the production of other volatile acids is excluded on account of the high temperature requisite with these.

Concentrated formic acid is decomposed at lower temperatures gradually and at higher temperatures more quickly by concentrated sulfuric acid into carbon monoxid and water. This is the reason of the complete failure of the former attempts to produce an acid of more than about seventy per cent. concentration directly from a formiate and sulfuric acid, and even this is able to be produced only by the observance of certain precautions. That by the use of sulfuric acid of a strength of 66° Baumé or stronger a decomposition of the formic acid can be avoided was therefore not to be accepted without further proof, especially as on mixing the formiate with the concentrated sulfuric acid a very considerable rise of temperature, at least locally, occurred, which generally occasioned violent decomposition, and it is both an unexpected and a technically very weighty result of this process that it has been rendered possible to obtain immediately a one-hundred-per-cent. formic acid from a formiate and very strong sulfuric acid without the least occurrence of decomposition, which is otherwise inevitable.

I claim as my invention—

1. The herein-described process for making directly-concentrated formic acid, which consists in dissolving the formiate in a solvent suitably free from water and then adding concentrated sulfuric acid to this solution whereby liberation of the formic acid results.

2. The herein-described process for making directly-concentrated formic acid, which consists in dissolving the formiate in a solvent, suitably free from water, then adding concentrated sulfuric acid to this solution whereby liberation of the formic acid results, and then subjecting the mass to distillation and condensing the distilled vapors.

3. The herein-described process for making directly-concentrated formic acid, which consists in dissolving the formiate in concentrated formic acid, then adding concentrated sulfuric acid to this solution and then separating the formed sulfate.

4. The herein-described process for making directly-concentrated formic acid, which consists in dissolving the formiate in formic acid then adding concentrated sulfuric acid to this solution, then subjecting the mass to distillation and condensing the distilled vapors.

In testimony whereof I have signed my name to this specification in the presence of two subscribing witnesses.

MAX HAMEL.

Witnesses:
JOHANNES HEIN,
WOLDEMAR HAUPT.